(12) United States Patent
Adipietro et al.

(10) Patent No.: US 10,526,124 B2
(45) Date of Patent: Jan. 7, 2020

(54) SURFACE DISTORTION DETECTOR FOR PACKAGING

(71) Applicant: International Business Machines Corporation, Armonk, NY (US)

(72) Inventors: John Adipietro, Kittrell, NC (US); Darcee Brunson, Raleigh, NC (US); Thomas Cheney, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 15/164,110

(22) Filed: May 25, 2016

(65) Prior Publication Data
US 2017/0341843 A1    Nov. 30, 2017

(51) Int. Cl.
*B65D 79/02* (2006.01)
*B32B 37/18* (2006.01)
(Continued)

(52) U.S. Cl.
CPC ............... *B65D 79/02* (2013.01); *B32B 5/18* (2013.01); *B32B 7/08* (2013.01); *B32B 7/12* (2013.01);
(Continued)

(58) Field of Classification Search
CPC ....... B32B 15/046; B32B 15/08; B32B 15/20; B32B 2250/03; B32B 2311/24; B32B 2553/00; B32B 37/12; B32B 37/182; B32B 5/18; B32B 7/08; B32B 7/12; B65D 79/02; G01L 9/0072; G01L 9/0073; G01L 9/0075; G01L 9/0058; G01L 5/165; G01L 5/228; G01L 9/12; G01L 9/0001; G01L 5/161; G01L 5/16; G01L 5/0052; G01L 5/0061; G01L 5/0028; G01L 5/00; G01L 5/06; G01L 5/10; G01L 5/107; G01L 5/0033; G01L 1/04; G01L 5/0071; G01N 13/02; G01N 2013/0291; B01L 3/5085
(Continued)

(56) References Cited

U.S. PATENT DOCUMENTS 3,229,433 A * 1/1966 Miles ........................ B63B 3/48
114/85
4,050,976 A * 9/1977 Reiters ..................... G01B 7/18
156/233
(Continued)

FOREIGN PATENT DOCUMENTS

EP 000561645 A1 9/1993

OTHER PUBLICATIONS

"Defect Scanner Series", Synergx Technologies.
(Continued)

*Primary Examiner* — John Fitzgerald
*Assistant Examiner* — Truong D Phan
(74) *Attorney, Agent, or Firm* — Tihon Poltavets

(57) ABSTRACT

Detecting mishandling of a packaging container. The apparatus includes: a first layer, a second layer to detect pressure placed on the packaging container, a third layer to provide spacing between the second layer and the packaging container, and an adhesive layer. The first later is a made of a rigid material. The first layer attaches to the second layer, and the second layer attaches to the third layer to form a composite structure of the first, second and third layers that attaches to the adhesive layer.

3 Claims, 5 Drawing Sheets

(51) Int. Cl.
*B32B 37/12* (2006.01)
*B32B 7/12* (2006.01)
*B32B 5/18* (2006.01)
*B32B 15/20* (2006.01)
*B32B 7/08* (2019.01)
*B32B 15/04* (2006.01)
*B32B 15/08* (2006.01)
*B32B 37/14* (2006.01)

(52) U.S. Cl.
CPC ............ *B32B 15/046* (2013.01); *B32B 15/08* (2013.01); *B32B 15/20* (2013.01); *B32B 37/12* (2013.01); *B32B 37/182* (2013.01); *B32B 2250/03* (2013.01); *B32B 2311/24* (2013.01); *B32B 2553/00* (2013.01)

(58) Field of Classification Search
USPC .......... 73/718, 724, 64.49, 862.471, 862.53, 73/865.8
See application file for complete search history.

(56) References Cited

U.S. PATENT DOCUMENTS

| | | | | |
|---|---|---|---|---|
| 4,345,641 | A * | 8/1982 | Hauser | B60K 11/04 123/41.48 |
| 5,315,366 | A | 5/1994 | Inada et al. | |
| 5,486,164 | A * | 1/1996 | Streck | A61M 5/3243 604/198 |
| 5,533,686 | A * | 7/1996 | Wirz | B65H 54/2884 242/476.7 |
| 5,836,448 | A * | 11/1998 | Weder | B65D 25/10 206/423 |
| 6,701,001 | B1 | 3/2004 | Kenneway et al. | |
| 7,394,937 | B2 | 7/2008 | Sones | |
| 7,653,235 | B2 | 1/2010 | Mylaraswamy et al. | |
| 9,191,488 | B2 * | 11/2015 | Savino | H04M 1/72569 |
| 2003/0065348 | A1 * | 4/2003 | Hess | A61B 17/00008 606/159 |
| 2003/0228447 | A1 * | 12/2003 | Letzelter | D21H 19/66 428/172 |
| 2005/0234295 | A1 * | 10/2005 | Gomez | A61B 1/00142 600/121 |
| 2008/0286543 | A1 * | 11/2008 | Metrot | B32B 5/18 428/213 |
| 2009/0028417 | A1 | 1/2009 | Floeder et al. | |
| 2009/0257911 | A1 * | 10/2009 | Thomas | A61B 5/14532 422/22 |
| 2011/0200813 | A1 * | 8/2011 | Okura | B29C 44/5654 428/220 |
| 2012/0120229 | A1 | 5/2012 | Brantley et al. | |
| 2013/0111972 | A1 * | 5/2013 | Subhash | G01M 3/366 73/12.01 |
| 2013/0333442 | A1 * | 12/2013 | Kibat | G01L 1/247 73/12.09 |
| 2014/0102221 | A1 * | 4/2014 | Rebhan | B30B 15/062 73/862.381 |
| 2014/0365009 | A1 * | 12/2014 | Wettels | B25J 9/1612 700/258 |
| 2015/0196149 | A1 * | 7/2015 | Savenok | B65D 85/72 220/577 |
| 2016/0033343 | A1 * | 2/2016 | Park | G01L 1/205 73/862.046 |
| 2016/0302729 | A1 * | 10/2016 | Starr | A61B 5/0004 |

OTHER PUBLICATIONS

Pressure metrics, Pressure Sensing Films, https://www.pressuremetrics.com/, last visited Jan. 22, 2016.

Tekscan, Pressure Mapping, Force Measurement & Tactile Sensors, https://www.tekscan.com/product-group/test-measurement/force-measurement?tab=products-solutions, last visited Jan. 22, 2016.

Global Industries, Tip-N-Tell Indicator, http://www.globalindustirial.com/p/packaging/boxes-cartons/packaging-accessories/tip-n-tell-indicator, last visited Jan. 22, 2016.

* cited by examiner

SURFACE DISTORTION DETECTOR FOR PACKAGING

BACKGROUND OF THE INVENTION

1. Field of the Invention

The embodiments described herein relate to product packaging and shipping boxes, and more specifically to detecting mishandling of product packaging.

2. Description of the Related Art

Mishandling of packaging may occur during shipping of expensive, bulky, or sensitive equipment, causing concern for recipients of that equipment. Some existing product packaging contain visual indicators on the exterior of the product packaging (e.g., "this end up", "do not push here", etc.) to signal to a sender of a package that some orientation, or force applied to the packaging is appropriate in view of what is being shipped.

SUMMARY OF THE INVENTION

According to one aspect, an apparatus for detecting distortion of a packaging container is provided. The apparatus includes: a first layer; a second layer to detect pressure placed on a packaging container; a third layer to provide spacing between the second layer and the packaging container; a first bonding layer; a second bonding layer; a third bonding layer. The first layer is a made of a rigid material, and by the third bonding layer, the first layer attaches to the second layer, and, by the second bonding layer, the second layer attaches to the third layer, thereby forming a composite structure of the first, second and third layers and the second and third bonding layers, the composite structure attaching to the first bonding layer.

According to another aspect, a method of constructing a packaging container with a detection apparatus to detect distortion of the packaging container is provided. The method includes: applying a first bonding layer to an inner surface of a packaging container; providing a base layer, wherein the base layer is made of a rigid material; applying, on the base layer, a detection layer; applying, on the detection layer, a flexible layer. Applying the base layer on the detection layer includes applying a third bonding layer to secure the base layer to the detection layer; applying the detection layer to the flexible layer includes applying a second bonding layer to secure the detection layer to the flexible layer, and applying, on the first bonding layer, a composite structure formed by the base layer, the detection layer, and the flexible layer, and the second and third bonding layers, where, just before shipping the packaging container, the base layer is removed to expose the detection layer.

According to another aspect, a method to detect distortion of a packaging container is provided. The method includes: inspecting a severity of distortion of a detection layer of a detection apparatus, the detection apparatus including: a base layer; the detection layer to detect pressure placed on a packaging container; a spacer layer to provide spacing between the second layer and the packaging container; and a first bonding layer. The base layer is a made of a rigid material, and the base layer attaches to the detection layer by a third bonding layer, and the detection layer attaches to the spacer layer by a second bonding layer, thereby forming a composite structure of the base, detection and spacer layers that attaches to the bonding layer. The detection layer is made of a material that receives and captures an imprint produced by a force applied to an outer surface of the packaging container, thereby providing a recipient of the packaging container with a visual indicator as to the severity of distortion.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION OF PREFERRED EMBODIMENTS

It will be readily understood that the components of the present invention, as generally described and illustrated in the Figures herein, may be arranged and designed in a wide variety of different configurations. Thus, the following detailed description of the embodiments of the apparatus and method, as presented in the Figures, is not intended to limit the scope of the embodiments, as claimed, but is merely representative of selected embodiments.

Reference throughout this specification to a "select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings wherein like parts are designated by like numerals throughout. The following description is intended only by way of example, and simply illustrates certain selected embodiments of apparatuses and processes that are consistent with the embodiments as claimed herein.

Product packaging may be distorted or damaged in some manner when product packaging is mishandled. When shipping sensitive and/or valuable products or materials, it is important for the recipient to understand if the product component, itself, has been impacted as a result of the mishandling and subsequent distortion of the product's packaging container. Embodiments described herein provide a way for a package's recipient to more easily detect whether there has been some amount of pressure applied to a product's packaging to have actually reached and/or damaged equipment inside the packaging. Furthermore, in those instances where the product's packaging has no visible damage upon delivery, but the product packaging may have been distorted at some point in time during shipping (i.e., packaging may have been reformed to its original shape before reaching its recipient), embodiments provide the recipient with a way to validate if some pressure has been applied to the product equipment.

Figure 1:
FIG. 1 depicts a cross-sectional view of a detection apparatus in accordance with an embodiment.

According to an embodiment, FIG. 1 depicts a schematic diagram of an interior surface of packaging container 100 including the surface distortion detector of the present invention, surface distortion detector 106. Interior surface 101 represents any interior surface of a conventional packaging container chosen for implementation with the surface distortion detector. Layers 102, 108, 109 are bonding layers, respectively, first bonding layer 102, second bonding layer 108, and third bonding layer 109. Bonding layers 102, 108, 109 can be glue, tape, or any other adhesive agent applied to a surface of a material to bind it together with another material or surface, and that provides resistance against separation of the attached materials or surfaces. Bonding layers 102, 108, 109 can also be in the form of a mechanical fastener, for example, a staple, stitch, or clasp. Bonding layers can also be implemented as one or more polymer functional layers, attachable to other layers by thermal bonding. Preferably, first bonding layer 102 is a layer of adhesive. First bonding layer 102 is used to attach composite structure 107 to interior surface 101. As further described below, composite structure 107 includes spacer layer 103, detection layer 104, base layer 105, second bonding layer 108 and third bonding layer 109. Surface distortion detector 106 includes first bonding layer 102 and composite structure 107.

Layer 103 acts as a spacer material between interior surface 101 and detection layer 104. Spacer layer 103 can be made of any pliable material or other suitable material used. By nature of the material used to form spacer layer 103, the layer can provide cushioning during product shipment. However, primarily, spacer layer 103 serves as a pliable medium for causing the detection layer 104 (described below) to conform to the surface of the shipping contents when sufficient force is applied. For example, spacer layer 103 may be made of a cushiony material such as corrugated fiberboard pads, or a pliable plastic material such as Bubble Wrap®. Spacer layer 103 also provides a layer of protection for the relatively delicate material used for detection layer 104.

Layer 104 is the detection layer. Detection layer 104 is made of a material that when pressed or impacted with some amount of force, retains a shape based on the direction of the force applied to it. Preferably, detection layer 104 is aluminum foil. Second bonding layer 108 is used to attach spacer layer 103 and detection layer 104.

In those embodiments where aluminum foil is used, the thickness of detector layer 104 can share a relationship with the weight or bulkiness characteristic of the product being shipped. Standard household foil is typically 0.016 mm (0.63 mils) thick, and heavy duty household foil is typically 0.024 mm (0.94 mils), and so, foil with thicknesses similar to that of standard household can be used for smaller, less bulky equipment. For larger, bulkier equipment, such as a computer server, foil with thicknesses similar to that of heavy duty household foil can be used.

As mentioned above, spacer layer 103 protects detection layer 104 from less forceful (e.g., soft) impact by interior surface 101. Some embodiments can also use thicker (e.g., multiple layers, or layered) layers for bonding layer 102 and spacer layer 103.

Layer 105 is a base, or support, layer. In preparing the surface distortion detector for attachment to product packaging for eventual shipment, layers 102, 103, 104, and 108 can be constructed on base layer 105. Base layer 105 provides support during construction of the detection mechanism because of its relatively rigid composition. Base layer 105 supports the other layers that make up the surface distortion detector, and layer 105 also preserves the integrity of the detection layer until the composite mechanism has been applied to a shipping box, Base layer 105 can be made of any material that is rigid, preferably an inexpensive, rigid material, such as polycarbonate plastic. Base layer 105 should be of a material that can support the manual attachment of the composite structure to the shipping container, without causing distortion of detection layer 104.

Third bonding layer 109 is used to attach detection layer 104 to base layer 105, and third bonding layer 109 should allow for simple removal of base layer 105, without causing distortion of detection layer 104. Base layer 105 also provides a protective feature—the layer can be removed, or discarded, moments before the product packaging is shipped. By removing the base layer, the surface distortion detector can operate in its intended fashion. In other words, with no rigid obstacle in place, distortion layer 104 is in a position to receive some force, thereby enabling its now exposed detection layer 104 to capture a physical input (i.e., force applied to an outer surface of the packaging container), distort, and retain a shape based on its impacting the equipment contained in the packaging. Detection layer 104 collapses on the equipment being shipped. As mentioned above, a preferable material for the detector layer is aluminum foil, and therefore, the aluminum foil layer would press against the equipment, thereby creating and retaining an imprint of the shape (or a portion thereof) of the equipment contacted.

As can be realized, the surface distortion detector also provides a cost-based advantage through the use of relatively inexpensive and accessible components.

Figure 2:
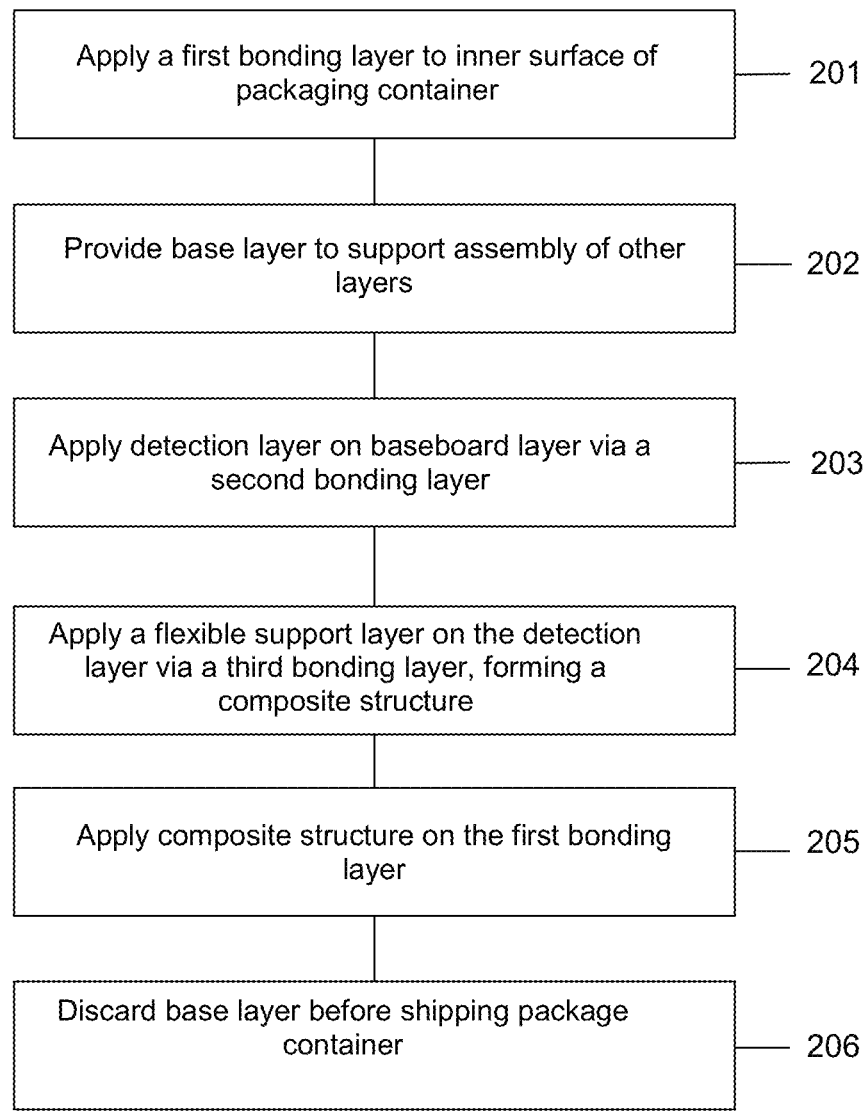
FIG. 2 depicts a flowchart illustrating a method in accordance with an embodiment.
Figure 3A:
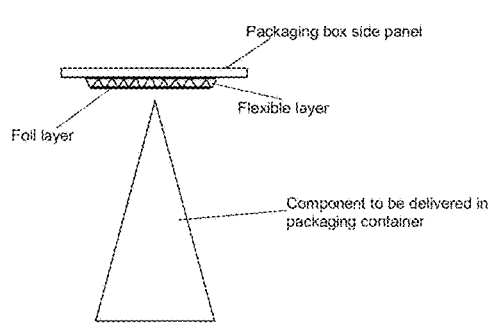
FIGS. 3A-3D depict an implementation of a detection apparatus, in accordance with an embodiment.
Figure 3B:
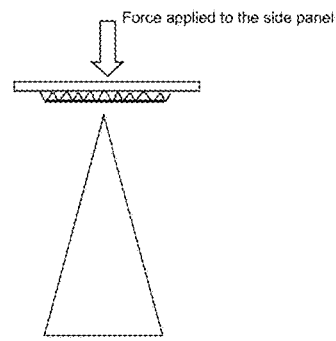
Figure 3C:
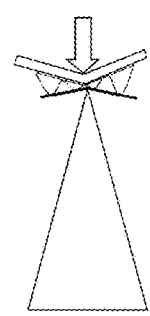
Figure 3D:
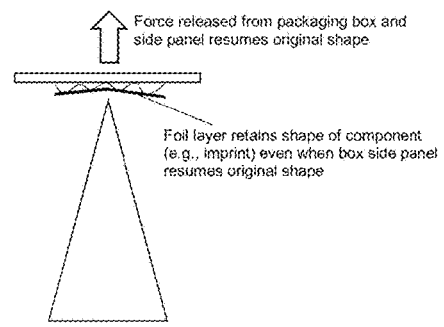

Embodiments also provide a method of constructing the surface distortion detector and installing the distortion detector on an interior surface of product packaging. The flowchart of FIG. 2 is described with reference to the layers shown in FIG. 1. The flowchart of FIG. 2 represents an embodiment of a method—a layer of adhesive used as the preferable material for first bonding layer 102. At 201, adhesive is applied to interior surface 101 of packaging container 100. At 202, base layer 105 is provided. At 203, detection layer 104 is applied on base layer 105 using an adhesive agent. For example, detection layer 104 can be applied using a roller or suitable applicator and attached to base layer 105 via adhesive or other suitable attachment means. At 204, spacer layer 103 is applied on detection layer 104. This forms composite structure 107 made up of spacer layer 103, detection layer 104, base layer 105, second bonding layer 108 and third bonding layer 109. At 205, composite structure 107 is applied on first bonding layer 102 and then attached to an internal surface of product packaging. Composite structure 107 can be first formed as a singular structure, then attach to any shipping container.

As to provide an uncreased, or "clean" sheet of aluminum foil for detection layer 104, at 206, base layer 105 is discarded moments before shipping the product packaging. Base layer 105 is preferably attached to detection later 104 through the use of an adhesive agent; in other words, third bonding layer is an adhesive agent in a preferred embodiment. This way, base 105 can be discarded (e.g., peeling, sliding or some similar motion, which may depend on the rigidity of the base layer and the type of attachment used) from detection layer 104 as to expose the uncreased layer of aluminum foil. Detection layer is now ready to capture an imprint of the packaged component once some force is applied to a surface of the product packaging during shipment and/or handling.

The surface distortion detector can be of various sizes. The distortion detector can be fixed at various points along an interior surface of a packaging container where external pressures are typically applied, or seen after mishandling of the product packaging, e.g., a cardboard box. For example, the distortion detector would line the internal top side of a box.

As another example, the distortion detector can also be implemented so as to line one or more interior surfaces of the box to provide the detection capability along more sides the box. For example, typical packaging boxes are formed of six internal surfaces, each internal surface in the shape of a rectangle or square. Standard packaging containers contain surfaces that are sized at least six inches in length, width, and height. Standard shipping boxes come in various forms (e.g., cube-shaped, flat boxes, mailer-type boxes, etc.), any of which can support the distortion detector. For example, from a two-dimensional perspective, at least one of the rectangular surfaces is sized eight inches (length) by eleven inches (width). In this example, the distortion detector can also be sized 8"×11" so as to lie along a single internal surface of the box. In the example of a box with six sides, given that there are five additional internal surfaces, five individual detection mechanisms can line each uncovered internal surface, sized in such a way as to completely cover each surface an individual detection mechanism is attached to. In another embodiment, in an instance where a larger shipping box is used, the distortion detector may be smaller in length and width dimensions than the actual surface to which it is applied, and it may be placed on an interior surface near and/or above a sensitive or fragile portion of the item being shipped.

Figure 4:
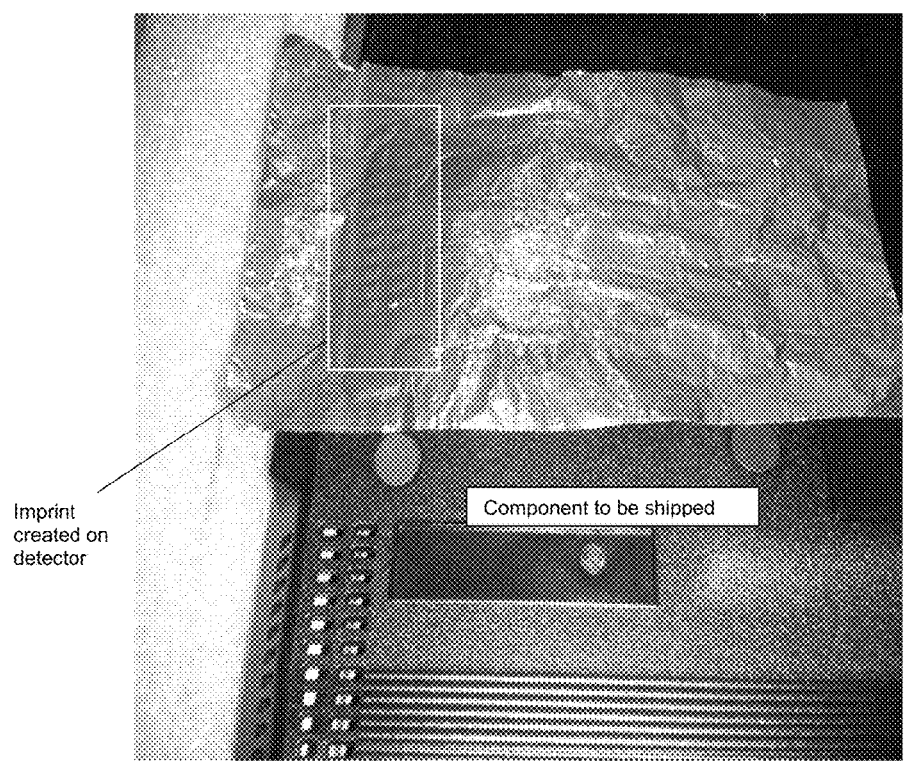
FIG. 4 depicts a resultant view of a detection apparatus in accordance with an embodiment.
Figure 5:
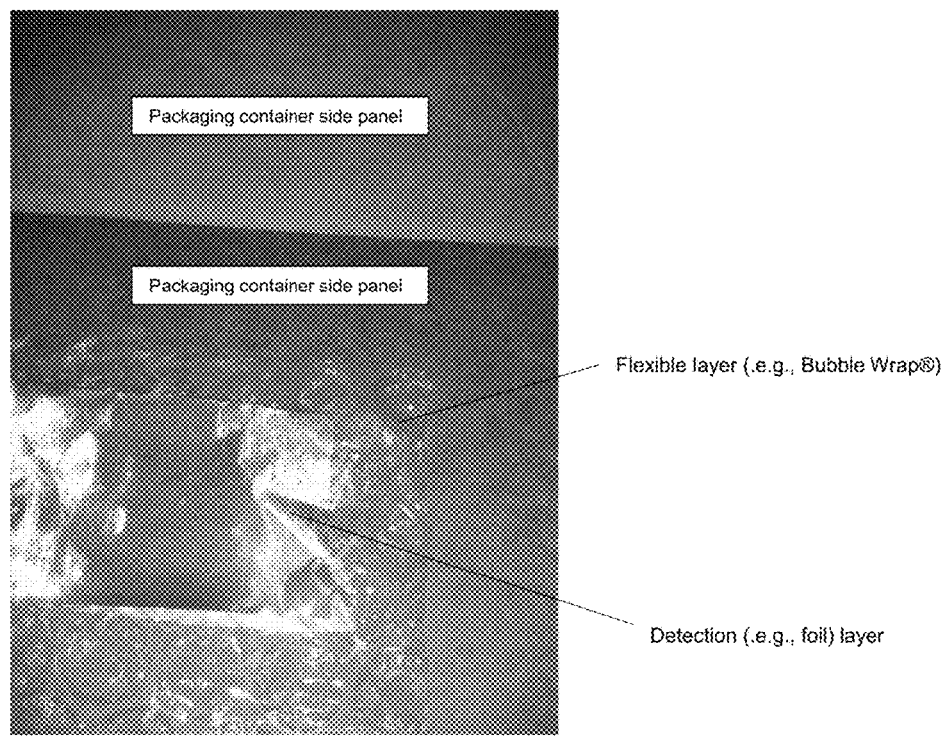
FIG. 5 illustrates a detection apparatus implemented with a packaging container, in accordance with an embodiment.

FIGS. 3-5 provide additional viewpoints on an exemplary implementation. FIG. 3A shows a packaging container side panel, the foil layer and flexible layers of the distortion detector, and a component that is to be delivered within the packaging container. In this example, the packaging container is a packaging box, such as a cardboard box, where the side panels of the box can flex inward under some pressure applied to them. FIG. 3B shows a force being applied to the box side panel, and FIG. 3C shows how the distortion detector may react to the pressure applied. The flexible layer and foil layers distort, at least, at the direct point of pressure applied. As the foil layer presses against the component, the foil, as it naturally performs, accepts the shape of the component, while creating an imprint of the component. As in FIG. 3D, as the force is released from the side panel of the box, the foil layer retains the shape of the component, via an imprint. In those instances when the side panel returns to its original orientation, an imprint can still be formed and retained on detection layer 104.

FIG. 4 provides a perspective as to how the foil layer, when pressed against a component to be shipped, forms an imprint of the component. The imprint provides a recipient of the packaged component a visual indicator that some force was applied to the component during shipping. When the package is shipped to some destination and the package is opened, the recipient can inspect the detector layer and be provided with a visual confirmation that some force impacted the packaged component. FIG. 5 provides a depiction of an exemplary implementation of the distortion detector as applied to an interior of a packaging container. The embodiment of FIG. 5 depicts the detection apparatus at a point in time when the base layer has been discarded before shipping the packaging, thereby providing an exposed, uncreased sheet of material (in this example, foil) as the detection layer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for detecting distortion of a shipping container, comprising:
    a first layer, a second layer, and a third layer, wherein the first layer is a material capable of preserving integrity of the second layer without causing distortion;
    the second layer to detect pressure placed on an interior surface of the shipping container is uncreased aluminum foil, wherein the second layer retains an imprint of a portion of a shape of equipment shipped in the shipping container based on a force applied to an outer surface of the shipping container;
    the third layer to provide spacing between the second layer and the shipping container, wherein the third layer is a corrugated fiberboard pad to provide a layer of protection for the second layer;
    a first bonding layer, wherein the first bonding layer attaches the third layer to the interior surface of the shipping container;
    a second bonding layer, wherein the second bonding layer attaches the second layer to the third layer; and
    a third bonding layer, that allows for a removal of the first layer without causing the distortion to the second layer, wherein a combination of the first layer, the second layer, the third layer, the second bonding layer, and the third bonding layer form a composite structure, wherein the first bonding layer attaches the composite structure to the interior surface of the shipping container.

2. The apparatus of claim 1, wherein the third layer is a foam sheet.

3. The apparatus of claim 1, wherein the first layer, the second layer, and the third layer comprises an adhesive agent.

* * * * *